United States Patent [19]

De Lapa et al.

[11] Patent Number: 5,353,218

[45] Date of Patent: Oct. 4, 1994

[54] FOCUSED COUPON SYSTEM

[75] Inventors: James P. De Lapa, Grand Rapids; Charles F. Howe, Spring Lake, both of Mich.

[73] Assignee: Ad Response MicroMarketing Corporation, St. Joseph, Mich.

[21] Appl. No.: 947,285

[22] Filed: Sep. 17, 1992

[51] Int. Cl.⁵ .............................................. G06F 15/21
[52] U.S. Cl. ..................... 364/401; 364/405
[58] Field of Search ............................... 364/401, 405

[56] References Cited

U.S. PATENT DOCUMENTS

| | | | |
|---|---|---|---|
| 4,723,212 | 2/1988 | Mindrum et al. | 364/401 |
| 4,833,308 | 5/1989 | Humble | 235/383 |
| 4,896,791 | 6/1990 | Smith | 221/7 |
| 4,908,761 | 3/1990 | Tai | 364/401 |
| 4,949,256 | 8/1990 | Humble | 364/401 |
| 4,957,311 | 9/1990 | Geisenheimer | 283/56 |
| 4,964,053 | 10/1990 | Humble | 364/466 |
| 5,053,955 | 10/1991 | Peach et al. | 364/401 |
| 5,128,520 | 7/1992 | Rando et al. | 235/375 |
| 5,173,851 | 12/1992 | Off et al. | 364/401 |

FOREIGN PATENT DOCUMENTS 8501373  3/1985  World Int. Prop. O. .......... 364/406

*Primary Examiner*—Roy N. Envall, Jr.
*Assistant Examiner*—Gita Shingala
*Attorney, Agent, or Firm*—Price, Heneveld, Cooper, DeWitt & Litton

[57] ABSTRACT

A merchandising system for generating and redeeming product discount coupons prints coupons for a selected consumer from a group of consumers by selecting particular coupons from a group of coupons to provide to the selected consumer and printing the coupons. Both the consumer and coupon identifications are encoded on the coupon in machine-readable form whereby the machine-readable code may be read at a point-of-sale terminal using a code reading apparatus. The portion of the read code corresponding to the consumer identification is replaced with a generic code to provide a substitute code. The substitute code is applied to a look-up table in order to determine coupon parameters related to the coupon identification. The entire machine-readable code may also be captured and uploaded to a central database for determining the coupon identification and consumer identification in order to update the database of consumers and coupons. In this manner, coupons redeemed by a consumer may be used in selecting future coupons for that consumer. The system may provide for coupon redemption by providing sufficient information to a manufacturer in order to generate a rebate to the retailer.

51 Claims, 11 Drawing Sheets

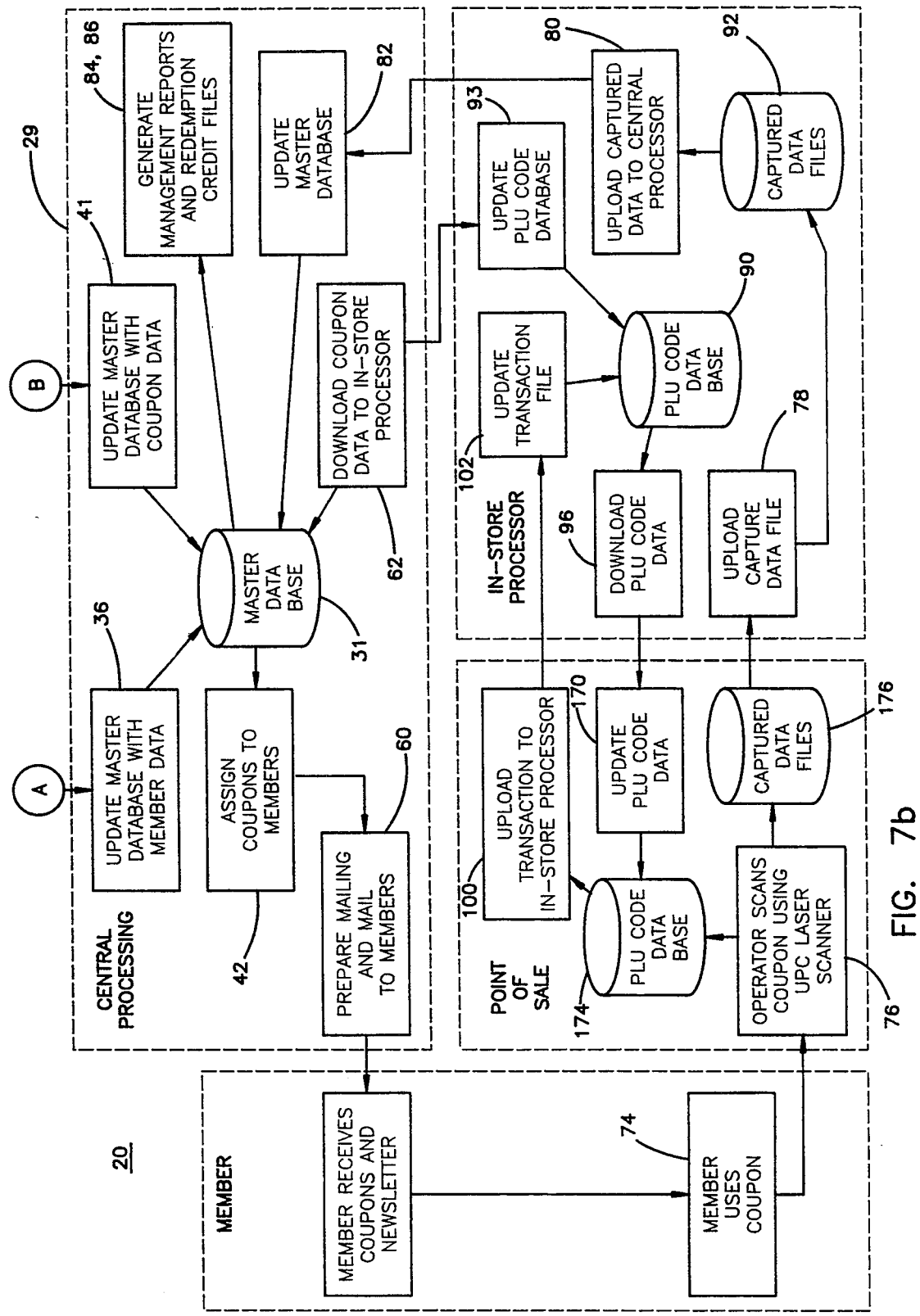

FOCUSED COUPON SYSTEM

BACKGROUND OF THE INVENTION

This invention relates generally to merchandising systems and more particularly to systems for generating and redeeming product discount coupons.

Discount coupons have long been distributed by manufacturers to merchandise their products and by retail stores to attract consumers to their particular stores. Both coupon types are typically distributed on a large scale basis as free-standing inserts in newspapers and other forms of mass distribution. Such coupons are effective only if used by a sufficiently high percentage of consumers. Using this gage, free-standing inserts are not very effective. Their redemption rate is presently approximately 2.8 percent and going down. Accordingly, alternatives are sought to such mass marketing techniques. Coupons are collected at stores and credit is provided to the customer purchasing the corresponding product. The coupons are bundled and forwarded to a clearing house and then to a redemption center for sorting and counting. Reports are then forwarded to the manufacturers issuing the coupons in order to generate a credit to the stores redeeming the coupons. Another problem with coupons is a significant misredemption rate of between 20 and 30 percent as a result of misidentification and outright fraud. The misredemption problem is exacerbated by the enormous amount of time, usually a number of months, that it takes to reimburse the retail stores for the discount given the consumer.

A new form of merchandising has evolved and has come to be known as micromarketing. Micro marketing is the tailoring of a message to a particular consumer based upon unique characteristics of that consumer. In order to effect such micromarketing, it is necessary to identify particular characteristics, such as the shopping habits, of particular consumers. One technique for identifying such characteristics is to match particular consumers with their purchases. Large retailers install systems based upon electronic customer-cards, provided to customers who pass a credit screen, in order to allow that consumer to cash checks or to debit purchases against their bank accounts. The electronic customer-card is passed through a special code reading device at the point-of-sale terminal in order to capture a personal identification number (PIN). The point-of-sale terminal also includes a laser scanner which identifies standard uniform product code (UPC) bar codes, applied to all products, in order to enter purchases into the in-store system. Purchases are matched to the customer through the PIN number. Because the file of the customer identified with the PIN code contains information regarding the income, demographic data, and the like, for that customer, an impressive data base may be established relating consumer characteristics to purchasing habits.

The problem with such customer-card based systems are many. The system is intrusive of the consumers' privacy expectations and tends to collect more data than is necessary to target merchandising to that customer. Furthermore, the large mass of data in the system makes it difficult for an individual product manufacturer to identify the consuming habits of its customers and, even if such information may be obtained, there is no efficient mechanism for converting this information into enhanced product sales. Furthermore, such systems tend to discriminate against low income individuals, and minority groups, because the electronic customer-cards are given only to credit-worthy customers. Furthermore, the electronic customer-card must be scanned by a separate reader at the point-of-sale terminal, which requires special equipment and a separate step on behalf of the cashier.

Coupons are currently being encoded with bar codes, such as UPC codes, which are provided for the purpose of identifying the manufacturer and brand of the product being discounted, the family of goods to which the product belongs and the value of the discount. A UPC standard coupon code has been established for this purpose. Additionally, a UPC standard has been established for "in-store" use by individual retailers. Such "in-store" codes have digits available that could be used by the retailer to identify a set of coupon parameters, similar to the standard coupon code. Coupons encoded with the UPC bar code may be scanned by the same scanner at the point-of-sale terminal which scans the UPC bar code of individual products being purchased. In this manner, the point-of-sale terminal may verify that a product matching the coupon has been purchased and properly credit the coupon value against the total amount of the purchase.

Systems have been proposed that combine a consumer identification code, or PIN, with a manufacturers' coupon in order to determine that a particular consumer has purchased a particular product for marketing research purpose. One such system is described in U.S. Pat. No. 4,908,761 entitled SYSTEM FOR IDENTIFYING HEAVY PURCHASERS WHO REGULARLY USE MANUFACTURERS PURCHASE INCENTIVES AND PREDICTING CONSUMER PROMOTIONAL BEHAVIOR RESPONSE PATTERNS. Both the consumer I.D., or PIN, number and the coupon parameters may be applied on the coupon in some fashion. While such systems achieve the purpose of matching particular consumers with particular purchases, they have failed to provide a means for effectively applying this information to the merchandising of products. Furthermore, such systems have not gained acceptance because they require separate scanning of the consumer I.D. code and the coupon I.D. code, which is a procedure which must be carried on separately from the redemption of the coupon. Conventional point-of-sale laser scanners will read only one UPC bar code field. If a coupon is encoded with more than one field, the scanner will read only the first field encountered and ignore the rest. This has made point-of-sale scanning of coupons, bearing a customer I.D. code, impractical. An additional problem with scanning coupons bearing a consumer I.D. code is a result of the need for a Product Look-up (PLU) record of each unique code to be identified in the point-of-sale system. Because a coupon bearing a particular customer I.D. number is a different (PLU) from the precise same coupon bearing a different customer I.D. number, the system would require a prohibitively large number of records in order to accommodate both consumer I.D. numbers and coupon parameter numbers in a point-of-sale terminal redemption scheme.

SUMMARY OF THE INVENTION

The present invention is intended to provide a coupon system which functions as both a mechanism for gathering information regarding the characteristics of particular customers as well as means for utilizing such characteristics in order to merchandise to that consumer. This may be accomplished in a manner which not only influences the decision of the customer to purchase a particular brand but entices customers into shopping at a particular retailer. A focused coupon system is provided which is nondiscriminatory as to consumer income or minority status and which invites participation by any and all consumers, with consumers being removed from the system only upon prolonged non-use. This is accomplished, according to the invention, in a system which provides total coupon redemption as an integral step in customary purchase checkout, with a single pass of a coupon bar code over conventional point-of-sale scanning equipment.

According to a first aspect of the invention, one or more coupons are generated by selecting a consumer from a group of consumers, selecting particular coupons from a group of coupons to provide to the selected consumer and printing the coupons. The coupons thus generated will be variable as to at least the identity of the consumer and a coupon identification, both of which are encoded on the coupon in machine readable form. The coupon identification will specify at least the discount value of the coupon and may additionally include a transaction to which the discount value is to apply. Other parameters such as an expiration date of the coupon may be included. In a preferred form, the consumer identification and coupon parameters will be combined in a single code which may be read by a single pass over conventional scanning equipment.

A method according to another aspect of the invention includes identifying a particular consumer, printing a packet of coupons for the identified consumer, transmitting the packet to the consumer, identifying which coupons in the packet the consumer uses and printing another packet of coupons for that consumer, with at least one coupon selected as a function of the coupons the consumer used. Other consumption related information pertaining to the consumer may be combined with the history of coupon use in order to select coupons to transmit to the consumer. This additional information may be obtained by a telephone interview with the consumer or by the consumer completing a survey of questions. The method is cyclically performed nondiscriminately for all consumers who wish to participate in the program. In a preferred form, the method is organized around a particular retail store or chain of stores and coupon values are selected for a consumer as a function of whether or not the consumer is a present customer of the particular retailer.

According to yet another aspect of the invention, coupons are printed bearing a machine readable code including a coupon identification number and a user number. The machine readable code is read at a point-of-sale terminal using a code reading apparatus. The portion of the read code corresponding to the user number is replaced with a generic code to provide a substitute code. The substitute code is applied to a look-up table in order to determine coupon parameters related to the coupon identification number. This eliminates the necessity for providing a record at the point-of-sale of each combination of coupon and user, which would be a prohibitively large number of records. The entire machine readable code may also be captured and uploaded to a central data base for determination of both the coupon parameters and the identification of the user in order to update the data base. The captured data may be used to redeem the coupons in order to cause the manufacturers to generate a rebate to the retailer.

Advantageously, the coupon redemption function can be performed on coupons not bearing a user number, which makes the system more useful.

These and other objects, advantages and features of this invention will become apparent upon review of the following specification in conjunction with the drawings.

BRIEF DESCRIPTION OF THE DRAWINGS

FIGS. 7a and 7b are data flow diagrams according to the invention;

DESCRIPTION OF THE PREFERRED EMBODIMENT

System Overview

Figure 1:
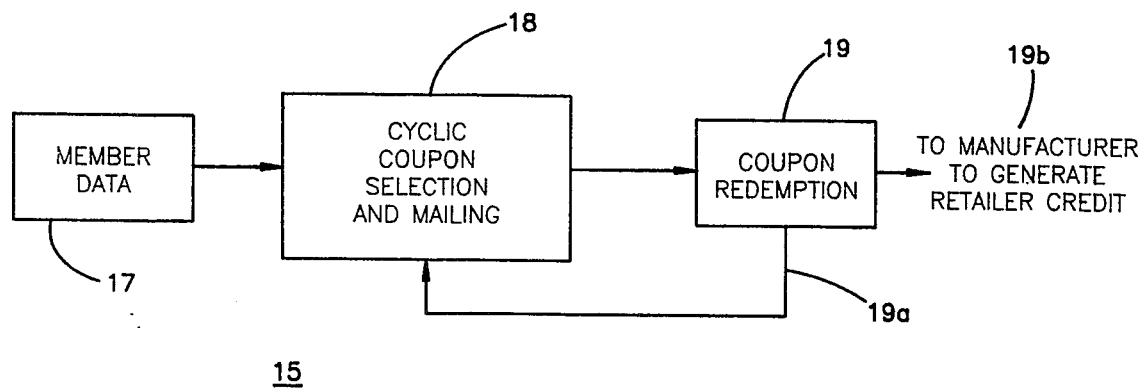
FIG. 1 is a block diagram of a focused coupon system according to the invention.

Referring now specifically to the drawings, and the illustrative embodiments depicted therein, a focused coupon system 15 is initially driven by member data 17 which is voluntarily provided by participants in the coupon program (FIG. 1). Consumers become program participants, or members, by accepting an invitation, or requesting participation, and voluntarily providing a relatively small amount of non-intrusive information such as their address and the retail store at which they presently shop. The consumer may also be provided with an optional survey, inquiring into the size and makeup of the household as well as the shopping preferences of the member. Focused coupon system 15 selects a plurality of coupons for each member based upon that members data and mails (18) a coupon packet. The system may distribute coupons, whose value have been provided by various manufacturers, in order to promote the products of that manufacturer. Such discounts are typically provided by the manufacturer in terms of a total discount which may be distributed among a number of coupons or a given discount per coupon. The system may also distribute "in-store" coupons, providing discounts against total purchases from the store or a particular department. Focused coupon system 15 assigns coupons to members in a unique manner as will be set forth in more detail below. Because the coupons are selected according to particular consumption needs of the member, average redemption rates will be higher than a mass marketing program.

Each coupon bears indicia identifying the particular coupon. A unique coupon I.D. number is associated with a given combination of discount value and other coupon parameters. For example, if the coupon applies to the purchase of a particular manufacturers product, that information will also be associated with the unique coupon I.D. number. Each coupon is encoded with a machine readable code which identifies the coupon I.D. and an I.D. number of the household of the consumer, or coupon club member, for whom the coupons are selected. When the member redeems the coupon at 19, the machine readable code is read at a point-of-sale terminal and is applied to a Product Look-up table (PLU) in order to ascertain the coupon I.D. and, hence, the product and discount value associated with that coupon in order to give the consumer the discount. The coupon I.D. and household I.D. are captured and fed back at 19A to the cyclic coupon selection and mailing function (18) in order to prepare a new selection of coupons for mailing to the member. This feedback results in the following cycle of coupon assignment to each member being more focused as a result of knowledge of the coupons previously redeemed by the member.

In contrast to prior coupon systems which track coupon redemptions only for the purpose of the market research and for deleting inactive members from their program, focused coupon system 15 utilizes coupon redemption history for the purpose of providing the member with coupons that are more likely to affect the purchasing decisions of the member. In particular, focused coupon system 15 is intended to induce each member to shop at the retailer participating in system 15 and to increase the total purchases from that retailer. This may be accomplished, for example, by assigning higher coupon values to non-customers of the participating retailer than to regular established customers, in order to further induce the consumer to the retailer's store. Focused coupon system 15 may also be utilized, for example, to determine particular departments, such as the delicatessen, which are not being utilized by a particular consumer and to provide coupons for purchases of items in the delicatessen. Other examples will readily suggest themselves to those skilled in the art. In the illustrated embodiment, cyclic coupon selection and mailing function 18 will be repeated from between six and thirteen times a year.

Advantageously, focused coupon and redemption system 15 may provide records of coupon redemptions for presentation to the manufacturers in order to obtain credits for the participating retailer, as illustrated at 19b. This redemption function reimburses the retailer more rapidly for the discount given to the consumer and greatly reduces the amount of errors and fraud opportunities in the redemption cycle. Coupon redemption (19) is not limited to coupons generated by focused coupon system 15. Because coupon system 15, in the illustrated embodiment, utilizes a uniform product code (UPC) bar code, of the type which is scanned by conventional laser scanners at point-of-sale terminals, coupon system 15 is capable of redeeming substantially any coupon bearing a UPC bar code. Even though any coupon bearing a machine readable code and identified at the point-of-sales terminal at the store, may be redeemed at 19b, coupon system 15 will not be capturing a household I.D. which would be absent from such non-system coupons.

Coupons

Figure 2:
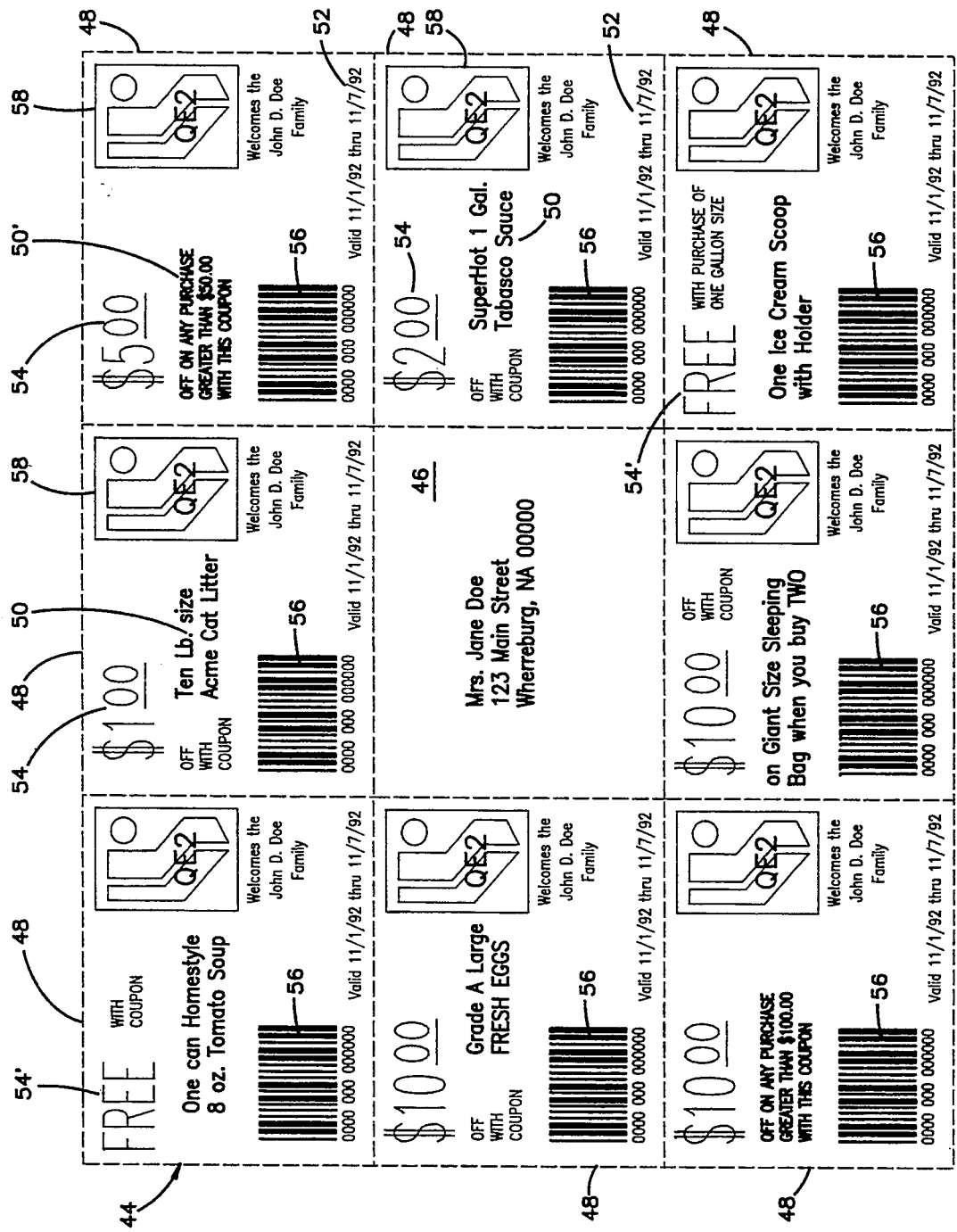
FIG. 2 is a coupon sheet generated by the system in FIG. 1.
Figure 3:
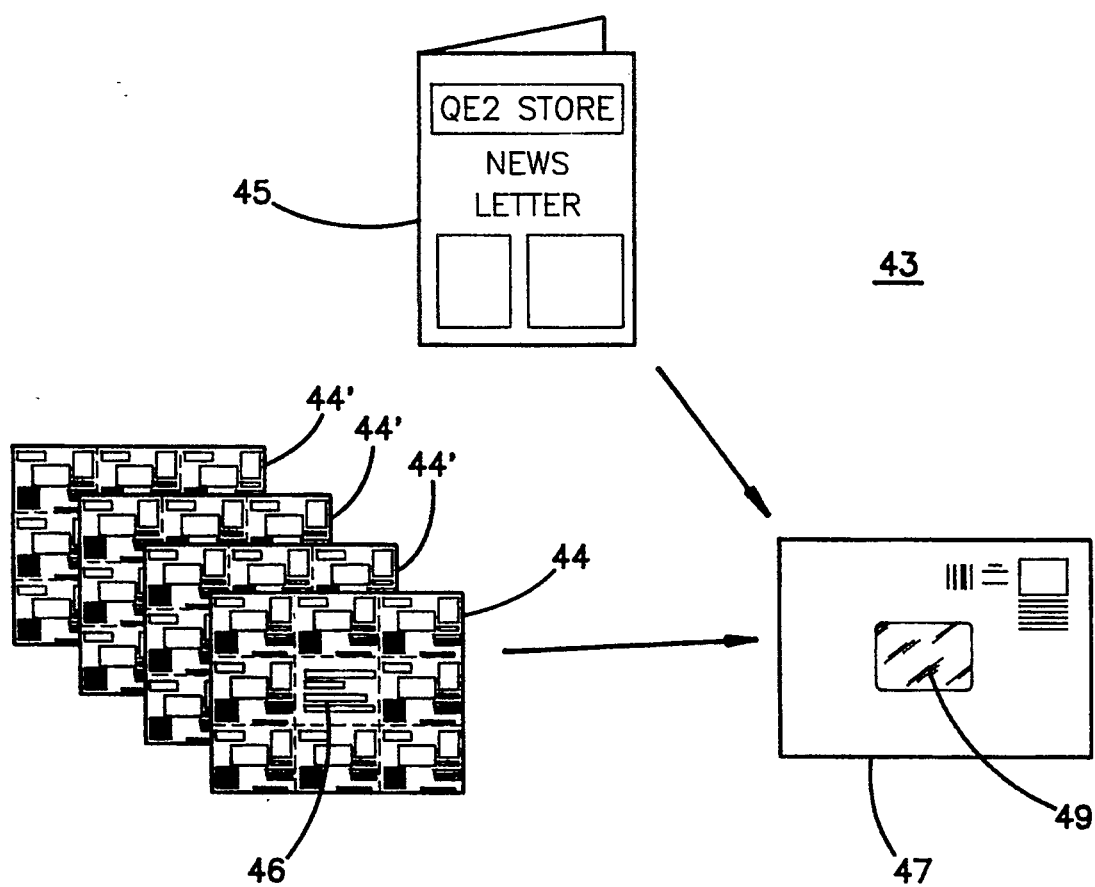
FIG. 3 illustrates component parts of a coupon packet generated by the system in FIG. 1.

A packet of coupons 43 is generated for each consumer in the data base (FIGS. 2 and 3). Each consumer is provided with a set of coupons that are selected for that consumer as a function of the data in a consumer master data base and a coupon data base. Each consumer is provided with the same number of coupons, selected as a function of the number which can conveniently fit onto a given number of sheets 44', the number of sheets being a function of postage rates and the like. One of the sheets 44 has one fewer coupons in order to allow a space for entering the name and address of the particular consumer or household 46. (FIGS. 2a and 3).

In the illustrated embodiment, coupon sheets 44 and 44' are mailed in a full sized windowed envelope 47 with the consumer or household indicia 46 appearing through an envelope window 49. In the illustrated embodiment, a newsletter, such as a multicolor offset printed letter 45, is included with each set of coupon sheets 44 and 44'. The purpose of the newsletter is in order to provide further information about the products discounted by the coupons, which may be included in the packet mailed to the particular consumer, as well as to provide information to the consumer that will further cause the consumer to value participating in the coupon program. Such information may include recipes, nutritional information, and other suggestions that are not directly of a commercial nature. In the illustrated embodiment, newsletter 45 will be the same for each consumer and, as such, may be printed using conventional multicolor offset printing techniques.

A data file establishing a set of coupons is generated for a particular customer one at a time as follows. Particular coupons may be designated "mandatory" and will be assigned to each customer until exhausted. After a customer is assigned mandatory coupons, additional coupons designated "optional" may be assigned to a consumer depending upon the attributes of the consumer, including answers provided by the consumer to a questionnaire. Any coupon slots remaining unfilled after the "optional" coupons have been selected for a given consumer will be filled from a group of "default" coupons. Whether a particular coupon is "mandatory", "optional" or "default" is included in a data base of coupon parameters.

Coupon sheets 44 and 44' are composed of a plurality of individual coupons 48. Each coupon includes indicia 50 identifying the product to which the particular coupon applies and an indicia 52 indicating the expiration date of the coupon (if any). Each coupon 48 further bears an indicia 54 identifying a particular value of the coupon. Value may be stated in terms of cents (or dollars) discount to the purchase price. However, the value could include a "free" product as illustrated at 54', two-for-the-price of-one, or other such value. Coupon 48 additionally includes a machine readable code 56 which, in the illustrated embodiment, is a UPC bar code. As will be set forth in more detail below, machine readable code 56 is encoded to allow access to the identity of the product or purchase criterion, the expiration date of the coupon and the discount amount. In addition, machine readable code 56 is encoded to allow access to the identity of the consumer, or household, identified 46, in a manner that will be set forth in more detail below. Because coupon system 15, in the illustrated embodiment, is specific to a particular retailer, coupon 48 will typically bear an indicia 58 identifying the particular retailer participating in the coupon program. Coupon 48 may additionally bear a logo (not shown), such as a trademark, identifying the product identified in indicia 50. It is not necessary that coupon 48 pertain only to a particular product. Alternatively, it could apply to a purchase from the participating retailer above a set amount, as indicated at 50' or apply to purchases at a particular department, such as the delicatessen department, of the retailer (not shown).

Coupon sheets 44 are printed using conventional laser page printers. Each of indicias 50, 52 and 54, as well as machine readable code 56 are variable from coupon-to-coupon. Although, in the illustrated embodiment, retailer indicia 58 is also laser jet printed, it is possible to print indicia 58 using conventional offset printing techniques because indicia 58 does not vary from coupon-to-coupon. Sheet 44 will be preprinted, on the reverse from the side operated on by the laser page printer, with standard coupon restrictions and with an "800" telephone number for nonmembers to call to become a member of the coupon program.

Hardware

Figure 4:
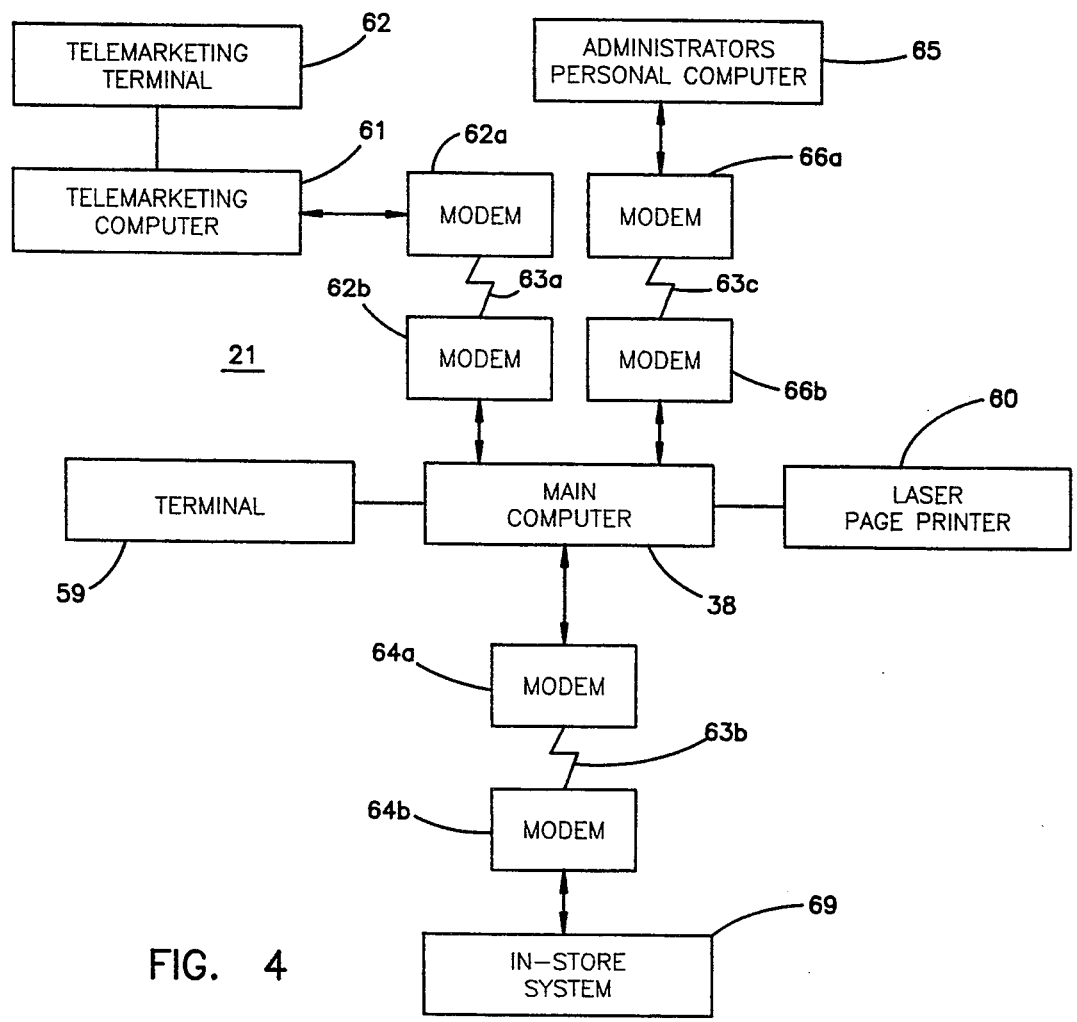
FIG. 4 is a block diagram of a hardware system useful with the present invention.

Coupon system hardware 21 is structured about a main computer 38 (FIG. 4). A terminal 59 provides access to main computer 38 for maintenance of programs, initiation of reports and the like. A laser printer 60 is driven by main computer 38 primarily for the purpose of printing coupon sheets 44. In the illustrated embodiment, laser page printer 60 prints the entire coupon including the product indicia 50, expiration date indicia 52, value indicia 54 and machine readable code 56. Retailer index 58 may also be printed by printer 60. A telemarketing computer 61, which is operated from a terminal 62, operates and maintains a member data base 25. See FIG. 7a. Computer 61 and terminal 62 are located at telemarketing center 27 and are connected via modem 62a, 62b and telephone link 63a with main computer 38. An administrator's personal computer 65 operates and supports the retailer and coupon data base 37 and is located at administrative center 35. As such, personal computer 65 is connected via modems 66a, 66b and telephone link 63c with main computer 38.

Figure 5:
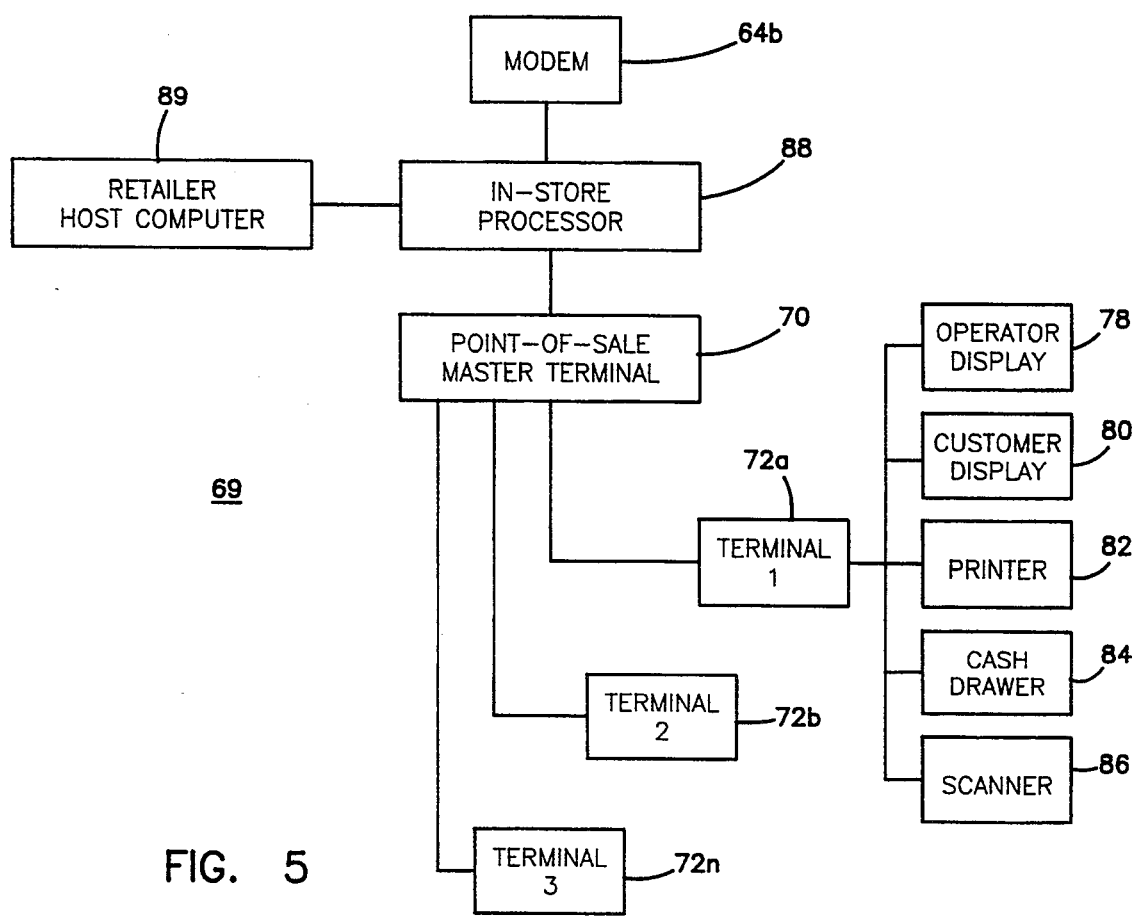
FIG. 5 is a block diagram of an in-store portion of the hardware system in FIG. 5, illustrating the portion of the hardware system in each retail store.

Coupon system hardware 21 includes one or more in-store systems 69, each interconnected with main computer 38 via modems 64a, 64b and telephone link 63b. As its name implies, in-store system 69 resides at a retail store participating in coupon system 15. If a chain of stores is a participant, then each individual store will typically have an in-store system. However, as would be apparent to the skilled artisan, in-store systems 69 for a chain may be merged in a central computer (not shown) for that chain which central computer is, then, connected with main computer 38 via modem 64a, 64b. In-store system 69 includes a point-of-sale master terminal 70 and a plurality of satellite terminals 72a, 72b . . . 72n, each associated with a checkout counter in the store (FIG. 5). Point-of-sale master terminal 70 supports a data base 174 correlating Product Look-up (PLU) codes and coupon I.D. codes and a data base 176 for temporary store of captured data files. See FIG. 7b. The purpose of PLU code data base 174 is to correlate a code read at a terminal 72a–72n to determine whether there is a match with a particular coupon I.D. which has been downloaded from a master data base 31. The purpose of captured data file data base 176 is to provide a temporary store for data which is captured at a terminal 72a–72b from each coupon 48 scanned at the associated checkout counter. Each terminal 72a–72n includes an operator display 78, a customer display 80, a printer 82, cash drawer 84 and a laser scanner 86.

In-store system 69 may additionally include an in-store processor 88. In-store processor 88 may provide a PLU code data base 90, which is updated from master data base 31, and a captured data file data base 92 which is updated from data base 176 residing in the point-of-sale master terminal 70. In order to update (93) the PLU code file in data base 90, master data base 31 downloads (62) coupon I.D. numbers and corresponding coupon parameters to the in-store processor 88. PLU code data base 90, in turn, downloads (96) PLU code data in order to update (170) PLU code data in data base 174. PLU code data base 174 uploads (100) approved coupon redemption transactions in order to update (102) the transaction file in PLU code data base 90. Point-of-sale master terminal 70 processes approved transactions in order to credit against the total purchase by the consumer and to indicate the transaction at the displays 78, 80 and printer 82. The transaction data is uploaded to in-store processor 88 for in-store statistical analysis, management and the like. The transactions, per se, are not uploaded to master data base 31.

Captured data files in data base 176 are uploaded (78) to data base 92 and, in turn, uploaded (80) via modem 64a and 64b in order to update (82) master data base 31. In-store system 69 may, optionally, include a retailer host computer 89 for the management of the data processing functions of the store and other functions not related to focused coupon system 15.

Main computer 38, in the illustrated embodiment, is marketed by Unisys Corporation of Bluebell, Pa. under Model A6NSU. Terminal 59 is marketed by Unisys under Model T27. Laser page printer 60 is marketed by Xerox, Inc. under Model 8700MOD5. Modems 62a, 62b, 64a, 64b, 66a and 66b are marketed by UDS under Model V.32. Telemarketing computer 61 is marketed by International Business Machines under Model RS-6000 and terminal 62 is also marketed by International Business Machine under Model ASCII. Main computer 38 runs release 3.8.1 of the model MCP operating system provided by Unisys Corporation. Additional Unisys software includes a COMS message control system, and DMSII data base management system. Data maintenance software is generated with fourth-generation language products Datapulse and Genpulse licensed from ESI, Inc., Tallashee, Fla. Coupon packets are assembled using automated insertion equipment (not shown) such as Mail Master marketed by Phillipsburg, a division of Bell & Howell.

In-store processor 88, in the illustrated embodiment, is a type 386 computer marketed by numerous manufacturers. In-store processor 88 runs a store-management software licensed from Bass, Inc. under Model RBX which is run on XENIX 386 operating system. Point-of-sale master terminal 70, and associated terminals 72a–72n are integrated systems marketed by National Cash Register Company under Model 2126 or 2127. Point-of-sale master terminal 70 is commercially supplied complete with operating software. The commercially available unit includes user selectable features for the data capture function described above in more detail below.

Process Overview

Figure 6:
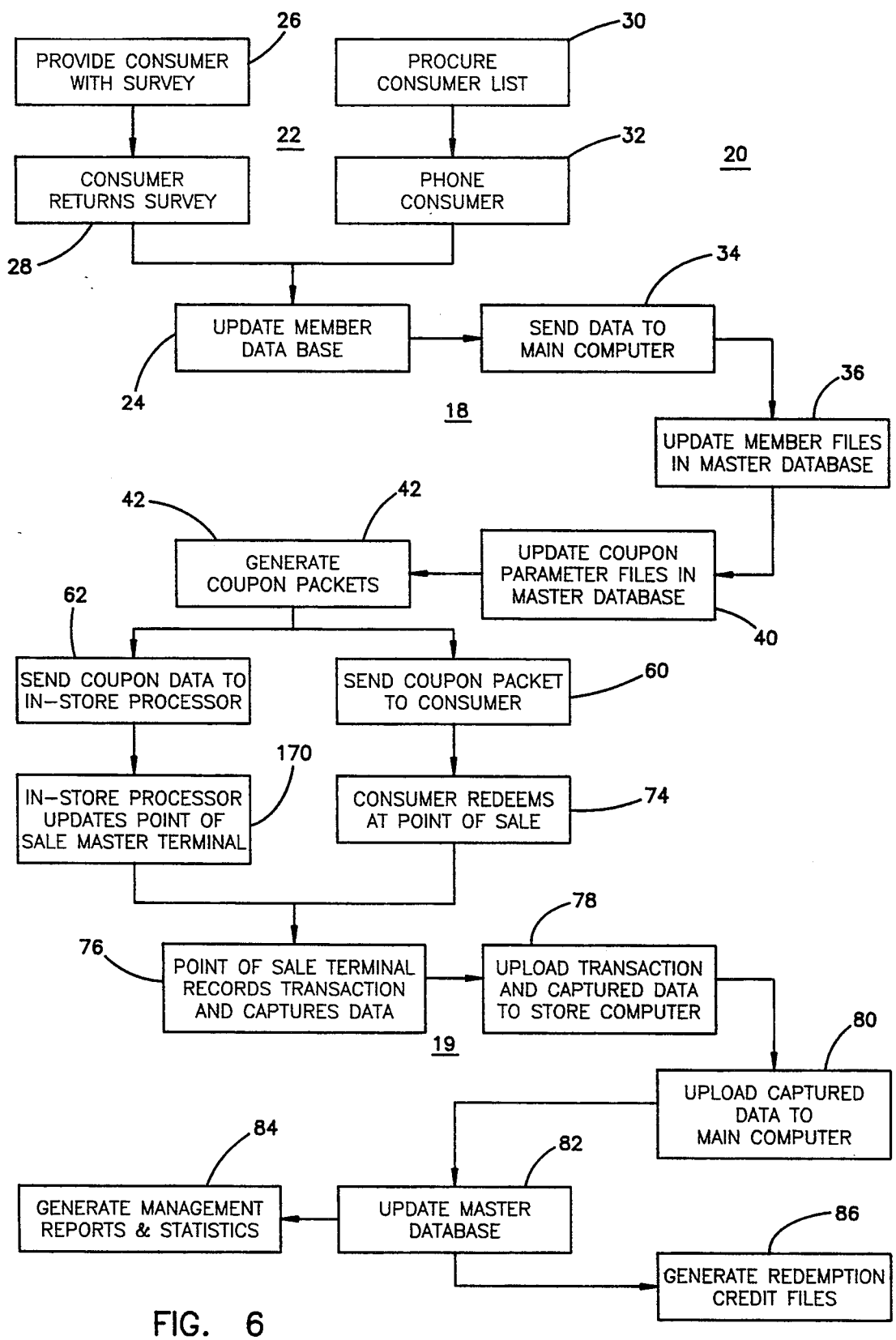
FIG. 6 is a flow diagram of a process according to the invention.
Figure 7A:
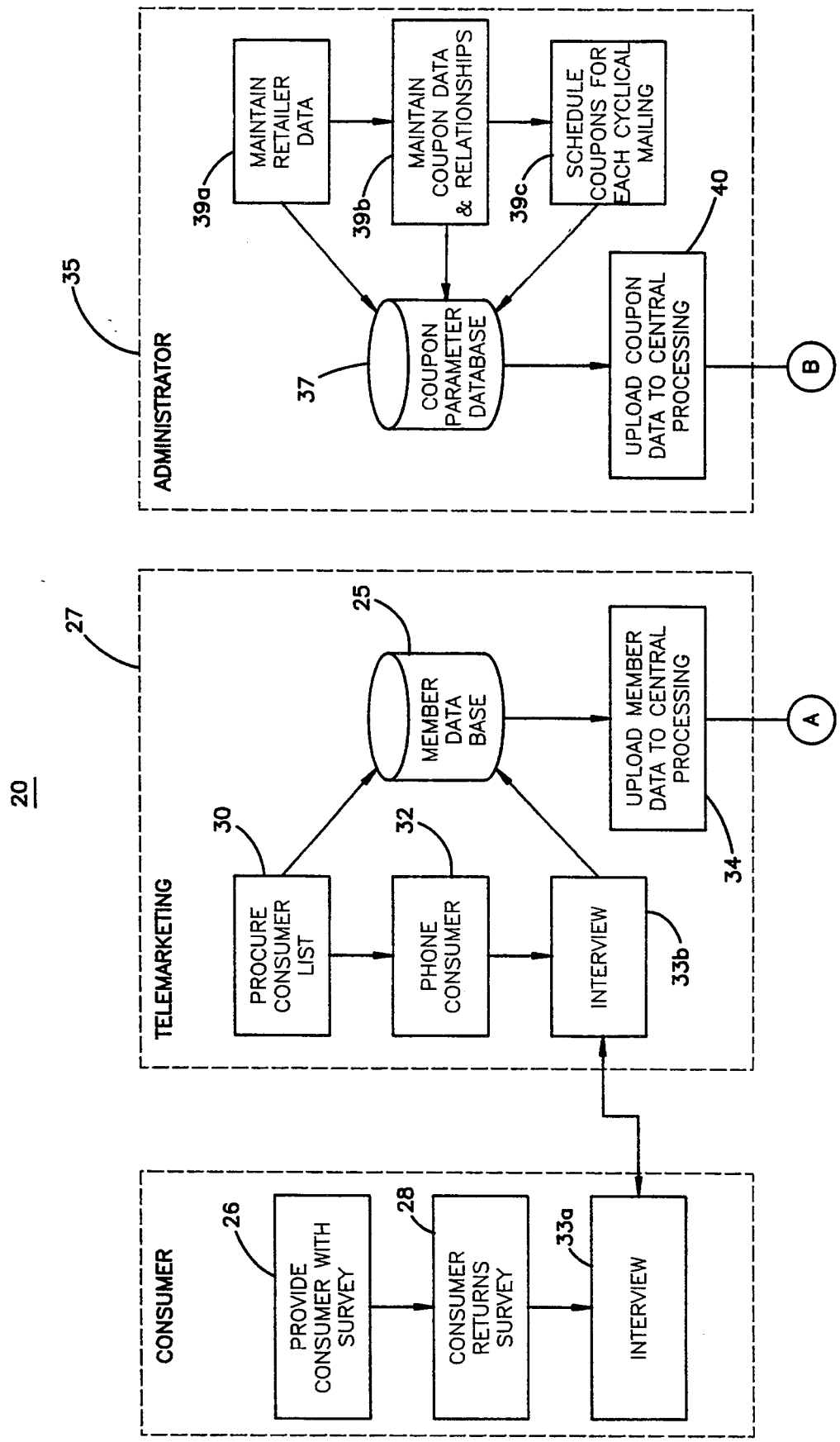

Focused coupon system 15 includes a coupon generation and redemption process 20 that is performed on system hardware 21. Coupon generation and redemption process 20 includes generating (22) a data base 25 of coupon program members (FIGS. 6, 7a and 7b). Generating step 22 may include providing (26) consumers with questionnaires, which some subset of consumers will return at 28. The questionnaires may be provided at the retail establishment participating in coupon system 15. Additionally, the questionnaire may be mailed to consumers who request participation in the coupon program. Additionally, the process may include procuring (30) a mailing list which is canvassed (32) in order to determine whether the listed consumers wish to become coupon program members. During telephone interviews 33A, 33B, additional information regarding the consumers demographics may be ascertained in order to update (24) the member data base, as will be set forth in more detail below. Resulting member data base 25 will include, for each member, the retail establishment where the member typically shops and other retail stores at which the member alternatively shops. For each member, data base 25 may additionally include demographic data such as the census ACORN in which the consumers household is located. The file in data base 25 for each member may additionally include consumption related information gleaned from answers to particular questions such as "Do you own a dog?", "Is there a male adult living in your household?" and the like. Data base 25 may be compiled and maintained at a remote telemarketing center 27 and uploaded (34) to a central processing center 29 having a master data base 31 in order to update (36) the data base. Master data base 31, in the illustrated embodiment, resides in main frame computer 38.

A program administration center 35 is provided in order to maintain a data base 37 of records regarding coupons which are available for distribution to consumers and records regarding the retailer participating in coupon system 15. A program administrator maintains (39a) data regarding the retailer, maintains (39b) coupon data and relationships and schedules (39c) coupons for each cyclical mailing of coupons. The coupon data includes parameters of the particular product for which a manufacturer has agreed to provide a promotional program, starting and expiration dates of the program (if any), a limit to the number of coupons which may be distributed (if any), a limit on the total amount of discounts which may be distributed (if any). The coupon parameter data base 37 also includes relationship parameters relating appropriate coupons and particular consumption needs of coupon program members. These relationships are necessary in order to facilitate the assignment of particular coupons to particular customers as will be described in more detail below. Coupon and retailer data base 37 is periodically uploaded (40) in order to update (41) master data base 31 with coupon and retailer data.

Periodically, a coupon selection and mailing cycle is initiated at 42. Coupon packets 43 are sent to consumers at 60. Concurrently, the coupon I.D. number and corresponding parameters of each particular coupon utilized in process 20 is downloaded (62) to the participating retailer via modem 64A, 64B and intervening telephone lines 66. The coupon I.D. number and related parameters are provided to the store management computer 68 in order to update the data in the Product Look-up (PLU) code data base 90 residing in the files of in-store processor 88. The PLU code data base is, in turn, downloaded (96) from in-store processor to point-of-sale master terminal 70 in order to update PLU code data base 174 residing therein.

The consumer receiving coupon packet 43 may choose to use (74) one or more coupons 48 in the packet. For reasons that will be set forth in more detail below, the coupons 48 are individually selected for each consumer in order to improve the redemption rate for the particular coupons. Furthermore, the newsletter 45 inserted in packet 43 will provide information directed towards stimulating the consumers interest in the products from which the coupons 48 will be selected, which should also tend to improve the redemption rate of the coupons. When the consumer purchases items and presents a coupon at 74, the products and coupons 48 are scanned (75) at point-of-sale terminal 72a–72n using scanning device 86. An operator (not shown) scans (75) the machine readable code 56 of each coupon 48 and the UPC of each purchase product, each with a single successful pass of the code past the scanner. In a manner that will be set forth in more detail below, point-of-sale master terminal 70 substitutes a specifically configured code for the scanned code for each coupon 48, and applies the substitute code as a PLU code to PLU code data base 174 in order to determine whether there is a match with a PLU code downloaded (62, 70) from the master data base. If the point-of-sale master terminal 70 determines a match with a PLU code, the corresponding coupon parameters are retrieved and an appropriate credit is applied to the purchase.

Concurrently with processing the coupon transaction in order to give the consumer credit for valid coupons, point-of-sale master terminal 70 captures in data files 176 the entire code embedded within machine readable code 56, during the scanning step 75. All of the data encoded in machine readable code 56 and captured by master terminal 70 is uploaded (78) to the In-store processor 88 and uploaded (80) via modems 64A, 64B and telephone link 66 in order to update (82) master data base 31. The captured data will be decoded at the master data base. The master data base will capture for each coupon 48 used by the consumer, data identifying the coupon I.D., namely product identification, coupon value, expiration date, as well as the identification code, or household code of the consumer. In a manner that will be set forth in more detail below, this information may then be utilized by coupon program 20 for the next coupon selection and mailing cycle 42.

Various management reports and statistics may be generated at 84 in order to provide information to the participating retailer regarding coupons redeemed, size of the particular order and other information. Reports may also be generated to the manufacturers supplying discount values for their products in order to provide market research information. Importantly, the information in master data base 31 may be used to generate at (86) redemption credit files which are provided to the manufacturers in order to redeem the coupons. This function of coupon redemption is exceptionally advantageous. The conventional coupon redemption cycle of several months is reduced to a matter of days or weeks. Furthermore, the misredemption and rampant fraud which take place in conventional coupon redemptions is significantly reduced. Because focused coupon system 15 is capable of being audited to establish its integrity, manufacturers will be assured that redemptions are indeed proper. In addition to redeeming coupons 48, system 21 will be capable of redeeming standard coupons that bear standard product code such as the UPC as will be set forth in more detail below.

Data Base Structures

Master data base 31 includes three files of records updated from member data base 25. A Consumer Master Structure, such as that shown in Table 1, will hold the name, address and demographic data for each member. In addition, such things as a household match key, total mailings sent, total number of coupons redeemed, date the record was created and data the source used to create it will be kept. The consumer master file will link to a Coupon History (Table 4) and, if a survey was completed, the Consumer Survey Data Structure (Table 3).

TABLE 1

| CONSUMER MASTER STRUCTURE | | |
|---|---|---|
| Fields: | RETAILER-ID | |
| | CONSUMER-ID | |
| | NAME-AREA | |
| | ADDRESS-1 | |
| | ADDRESS-2 | |
| | ADDRESS-3 | |
| | CITY | |
| | STATE | |
| | ZIP | |
| | PHONE | |
| | MATCH-KEY | |
| | DATA-SOURCE | |
| | DATA-CREATED | |
| | LAST-MAINTENANCE | |
| | LAST-MAIL-SEQUENCE | |
| | TOTAL-PACKAGES-SENT | |
| | COUPONS-REDEEMED | |
| | STORE-NUMBER | |
| | MISC-DATA | |
| |    ESTABLISHED-CUSTOMER | |
| |    COMPETITORS | |
| |    VISITS | |
| |    ACORN | |
| |    GEO-CODE | |
| | STATUS | |
| Accesses: | CONSUMER-ID-SET | (NO DUPLICATES) |
| | RETAILER-ID | |
| | CONSUMER-ID | |
| | HOUSEHOLD-SET | (NO DUPLICATES) |
| | RETAILER-ID | |
| | MATCH-KEY | |
| | STORE-NBR-SET | (NO DUPLICATES) |
| | RETAILER-ID | |
| | STORE-NUMBER | |
| | CONSUMER-ID | |

Another file generated by the telemarketing function is the Consumer Survey Data Structure file. This file will keep track of surveys sent to, and returned by, the consumers. When a survey is sent, a record of it will be stored. Information retained will consists of the date it was sent, the survey I.D. code and, if it was returned, the date it was received back. A record of a survey will be retained whether or not it has been returned. The consumer survey data structure file is illustrated in Table 2.

TABLE 2

| SURVEY RESPONSES | | |
|---|---|---|
| Fields: | RETAILER-ID | |
| | CONSUMER-ID | |
| | SURVEY-CODE | |
| | DATE-SENT | |
| | DATE-RETURNED | |
| Accesses: | CONSUMER-SET | (NO DUPLICATES) |
| | RETAILER-ID | |
| | CONSUMER-ID | |
| | SURVEY-CODE | |
| | SURVEY-SET | (NO DUPLICATES) |
| | RETAILER-ID | |
| | SURVEY-CODE | |

In addition, a Survey Answers Structure file is provided as illustrated in Table 3. This file is subordinate to the Consumer Survey Data Structure and will only contain data if the consumer has returned at least one of the surveys sent. For each survey code and question number, there will be as many possible responses as necessary.

TABLE 3

| SURVEY ANSWERS | | |
|---|---|---|
| Fields: | RETAILER-ID | |
| | CONSUMER-ID | |
| | SURVEY-CODE | |
| | QUESTION-NUMBER | |
| | RESPONSE-SEQUENCE | |
| | ANSWER-ALPHA | |
| Accesses: | CONSUMER-SET | (NO DUPLICATES) |
| | RETAILER-ID | |
| | CONSUMER-ID | |
| | QUESTION-NUMBER | |
| | RESPONSE-SEQUENCE | |

A Consumer Coupon History Structure file contains records of all coupons sent to and redeemed by a member. There will be one record for each coupon sent to each member. When the coupon is used by the member, the same record created when the coupon was sent will be updated with redemption data. A consumer coupon history structure file is illustrated in Table 4.

TABLE 4

| CONSUMER COUPON HISTORY | | |
|---|---|---|
| Fields: | RETAILER-ID | |
| | COUPON-KEY | |
| | CONSUMER-ID | |
| | MAIL-SEQUENCE | |
| | DATE-SENT | |
| | COUPON-AMOUNT | |
| | QUESTION-NUMBER | |
| | DATE-SCANED | |
| | STORE-NUMBER | |
| Accesses: | MAILING-SET | (NO DUPLICATES) |
| | RETAILER-ID | |
| | CONSUMER-ID | |
| | MAILING-SEQUENCE | |
| | COUPON-KEY | |
| | COUPON-SET | (NO DUPLICATES) |
| | RETAILER-ID | |
| | CONSUMER-ID | |
| | COUPON-KEY | |

A Coupon Master Structure file holds data for each coupon on the system. They need not be active to be in this file. Some may be set to activate at future dates while others may have expired and are being used for historical purposes. The structure will hold static data for a coupon and has a one-to-many relationship to the Coupon Offer Structure. The coupon master structure file is illustrated in Table 5. This file is created and maintained at the administrator center 35. The data in this file establishes the graphic appearance of each coupon in the system.

TABLE 5

| COUPON MASTER STRUCTURE | | |
|---|---|---|
| Fields: | RETAILER-ID | |
| | COUPON-KEY | |
| | MANUFACTURER (MFG) | |
| | MFG-UPC | |
| | PRODUCT-UPC | |
| | DESCRIPTION-1 | |
| | DESCRIPTION-2 | |
| | LOGO-ID | |
| | TIME-LAPSE | |
| | STATUS | |
| Accesses: | COUPON-KEY-SET | (NO DUPLICATES) |
| | RETAILER-ID | |
| | COUPON-KEY | |

A Current Coupon Data Structure file provides coupon-related data for one cycle of coupon packet mailing. This will allow for the same coupon to use a different value for each selection. Also, the maximum and/or the maximum number issued can be changed as necessary. These records will become a part of the coupon history after their expiration dates have occurred. This file, illustrated in Table 6, provides data for printing the coupon value indicia 54 and expiration indicia 52. A "current coupon key" is sequentially assigned at mailing production time to define a unique instance of the Coupon Master Structure for the purposes of relating expiration dates and variable values to specific coupons that are printed. All relations and history are maintained on the Coupon Master Structure (Table 5) using this table as a cross-reference.

TABLE 6

| | CURRENT COUPON | |
|---|---|---|
| Fields: | RETAILER-ID | |
| | COUPON-KEY | |
| | MAIL-SEQENCE | |
| | COUPON-AMOUNT | (OCCURS 5 TIMES) |
| | PRIORITY | |
| | NUMBER-MAX | |
| | NUMBER-USED | |
| | VALUE-MAX | |
| | VALUE-USED | |
| | START-DATE | |
| | END-DATE | |
| | EXPIRE-DATE | |
| | STATUS | |
| Accesses: | COUPON-SET | (NO DUPLICATES) |
| | RETAILER-ID | |
| | COUPON-KEY | |
| | MAIL-SEQUENCE | |
| | CURRENT-COUPON-KEY | |
| | MAILING-SET | (NO DUPLICATES) |
| | RETAILER-ID | |
| | MAIL-SEQUENCE | |
| | PRIORITY | |
| | CURRENT-COUPON-KEY | |
| | REDEMPTION-SET | (NO DUPLICATES) |
| | RETAILER-ID | |
| | CURRENT-COUPON-KEY | |

A Coupon/Answer Relations Structure file is established and maintained at the administrator center 35. This file is subordinate to the Coupon Master (Table 5) and is used for selecting coupons for a mailing packet. Each Coupon Master record will have one or more of these relations records attached to it. Each relations record holds the survey question number and the response from the member that is required for this coupon to be assigned to a members mailing packet. This applies only to those coupons that are designated "optional" for the mailing in progress. This file, illustrated in Table 7, is by-passed for "mandatory" and "default" coupons.

TABLE 7

| | COUPON/ANSWER RELATIONS | |
|---|---|---|
| Fields: | RETAILER-ID | |
| | COUPON-KEY | |
| | QUESTION-NUMBER | |
| | RESPONSE-SEQUENCE | |
| | ANSWER-ALPHA | |
| | STATUS | |
| Accesses: | COUPON-KEY-SET | (NO DUPLICATES) |
| | RETAILER-ID | |
| | COUPON-KEY | |
| | QUESTION-NUMBER | |
| | RESPONSE-NUMBER | |

A Mailing Selection Data Structure file (Table 8) will refer to data from coupon data base 37. It contains data of the coupon subset within the Coupon Master (Table 5) that are to be available for a particular mailing. Each coupon to be used will have assigned to it a priority code as follows:

A = "mandatory"
B = "optional"
C = "default".

These priorities are assigned by an administrator such as an account executive. Coupons designated mandatory are assigned to each member selected for the particular mailing. Optional coupons are selected and assigned based on the survey data selection process. Default coupons are to be used when all 35 coupon slots cannot be filled by "mandatory" and "optional" coupons or when a consumer has not returned a survey.

TABLE 8

| | MAILING DATA | |
|---|---|---|
| Fields: | RETAILER-ID | |
| | COUPON-KEY | |
| | MAIL-SEQUENCE | |
| | PRIORITY | |
| | WEEK-NUMBER | |
| | PAGE | |
| | POSITION | |
| Accesses: | COUPON-SET | (NO DUPLICATES) |
| | RETAILER-ID | |
| | COUPON-KEY | |
| | MAIL-SEQUENCE | |
| | WEEK-NUMBER | |
| | PRIORITY | |
| | MAIL-SEQUENCE | |
| | POSITION-SET | (NO DUPLICATES) |
| | RETAILER-ID | |
| | PAGE | |
| | POSITION | |

Other files will be provided to support the file structure outlined above. A Retail Master Structure file will hold data that is related to a retailer participating in the coupon system. A Store Structure file holds data for each individual store controlled by a participating retailer. A Survey Question Text Structure file will hold the text of the questionnaire questions for future reference.

Coupon Selection

Figure 8A:
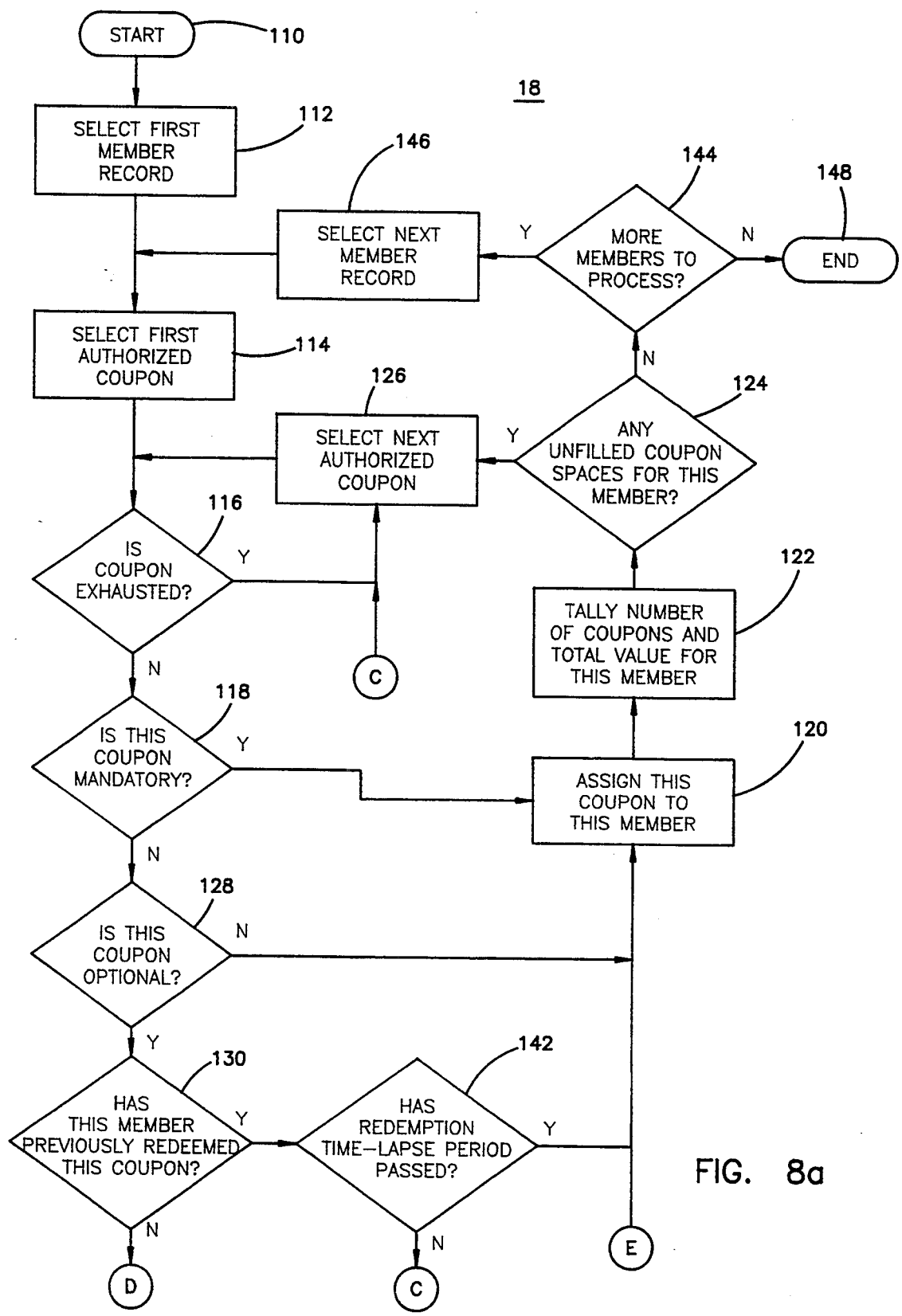
FIGS. 8a and 8b illustrate a flow chart of the cyclical coupon section and mailing routine.
Figure 8B:
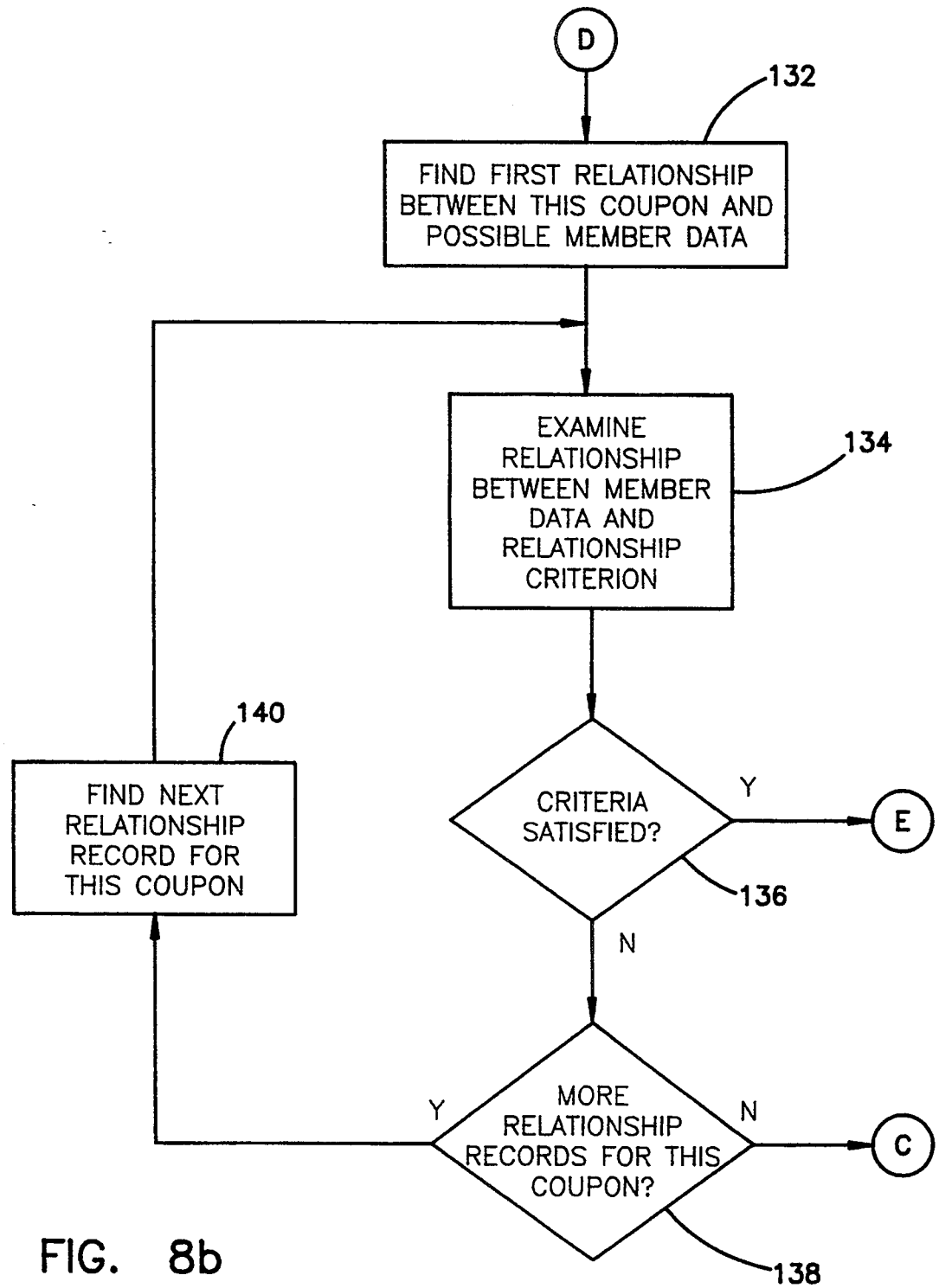

In order to generate coupon packets 43 for a set of members, a cyclic coupon selection and mailing function 18 is performed (FIGS. 8a and 8b). The routine is initiated (110) by selecting (112) the first record of a member. The Current Coupon Data Structure is accessed to select (114) the first coupon authorized for that mailing. It is then determined at (116) whether that coupon has been exhausted as a result of assignment to prior members. Because this is the first member, it will be determined at 116 that the coupon is not exhausted. It is then determined at (118) whether this coupon is mandatory. If the coupon is determined to be mandatory, the coupon is assigned to this member at 120. The number of coupons and the total value of coupons for this member is tallied at 122 and it is determined at 124 whether any unfilled coupon spaces exist for this member. For each mailing, in the illustrated embodiment, 35 coupon spaces are available. Unless all 35 spaces are filled, it will be determined at 124 that there are unfilled coupon spaces and the next authorized coupon will be selected (126) from the Current Coupon Data Structure file.

For the next authorized coupon, it will be determined at 116 whether that coupon is exhausted. Because this pass is for the first member record, it will be determined at 116 that the coupon is not exhausted. If it is determined at 118 that this next coupon is mandatory, then the same procedure outlined above will be repeated. Once all mandatory coupons are assigned, control will pass to 128 where it will determine whether this next coupon is optional. If this coupon is not "optional" it is a "mandatory" coupon and control will pass to 120 for assignment of this coupon to this member. After all mandatory and optional coupons have been processed, control continues to loop through 116, 118, 128, 120, 122 and 124 until all spaces are filled.

If it is determined at 128 that this coupon is optional, then it will be determined at 130 whether this member has redeemed this coupon before. If it is determined at 130 that this member has not redeemed this coupon before, the first relationship between this coupon and possible member data is located at 132 by accessing the Coupon/Answer Relations Structure file. The relationship between this member data and relationship criterion retrieved from the Coupon/Answer Relations Structure is examined at 134 and it is determined at 136 whether the criterion set forth therein is satisfied. If not, it is determined at 138 whether any additional relationship records exist for this coupon. If so, the next relationship record for this coupon is found at 140 and control passes to 134 where the relationship between this member data and the relationship criterion is examined. If it is determined at 136 that the criterion set forth is satisfied, then this coupon is assigned to this member at 120. If not, the loop repeats until all relationship records for this coupon are determined at 138 to be exhausted. Control then passes to 126 where the next authorized coupon is selected.

If it is determined at 130 that the member has not redeemed the particular coupon before, it is determined at 142 whether a given redemption time-lapse period has passed. The purpose of such time-lapse period is to avoid assigning a coupon to a particular member prior to the user consuming the previously purchased item. If the redemption time-lapse period has passed, the coupon is assigned to the member at 120. If the redemption time period has not passed, control passes to 126 where the next authorized coupon is selected.

When it is determined at 124 the number of coupons assigned to the first member fills all 35 slots for the member's coupon packet, that member's coupon packet is complete. The data is established for printing of the coupon packet using laser page printer 60. Control then passes to 144 where it is determined whether there remain any additional members to process. If so, the next member record is selected at 146 and the first authorized coupon is examined for that member at 114. The coupon assignment process proceeds for that next member until all coupon slots are filled, which enables that members packet to be printed. When it is finally determined at 144 that all members have been processed, the assignment function is exited at 148.

The cyclic coupon selection mailing routine selects coupons by consumer rather than visa versa. In order to determine whether an optional coupon is assigned to a particular member, answers provided by the member to the survey are examined for appropriate relationships. Thus, answers are examined in order to determine whether a coupon is appropriate rather than attempting to locate coupons which correlate with particular answers rendered by the member. The inclusion of mandatory, optional and default coupons ensures that all coupon slots will be filled for each member. If the member has not completed a survey, then the members coupon packet will be filled with mandatory and default coupons. If the survey has been completed, optional coupons will be included if appropriate relationships between member data and relationship criterion are met.

Coupon Redemption

Figure 9A:
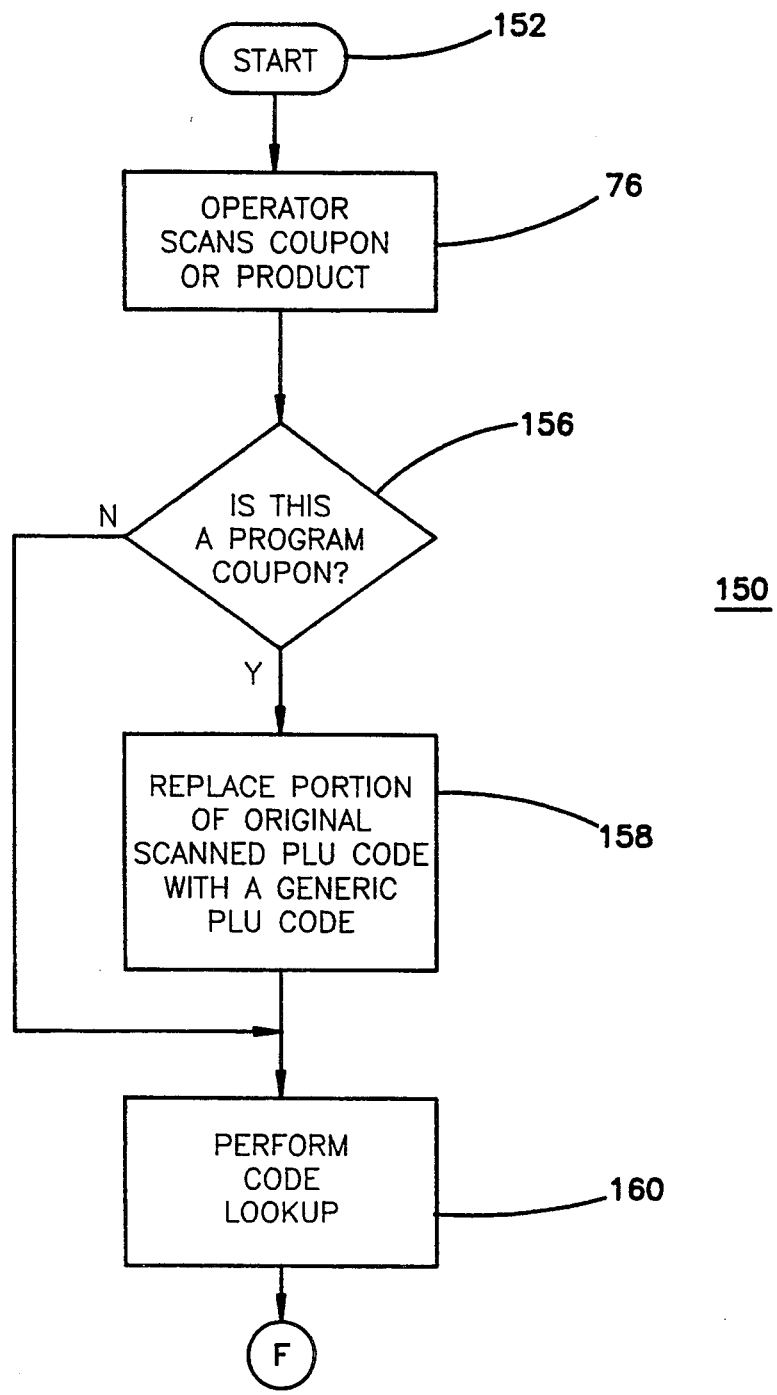
FIGS. 9a and 9b illustrate a flow chart of the coupon redemption routine.
Figure 9B:
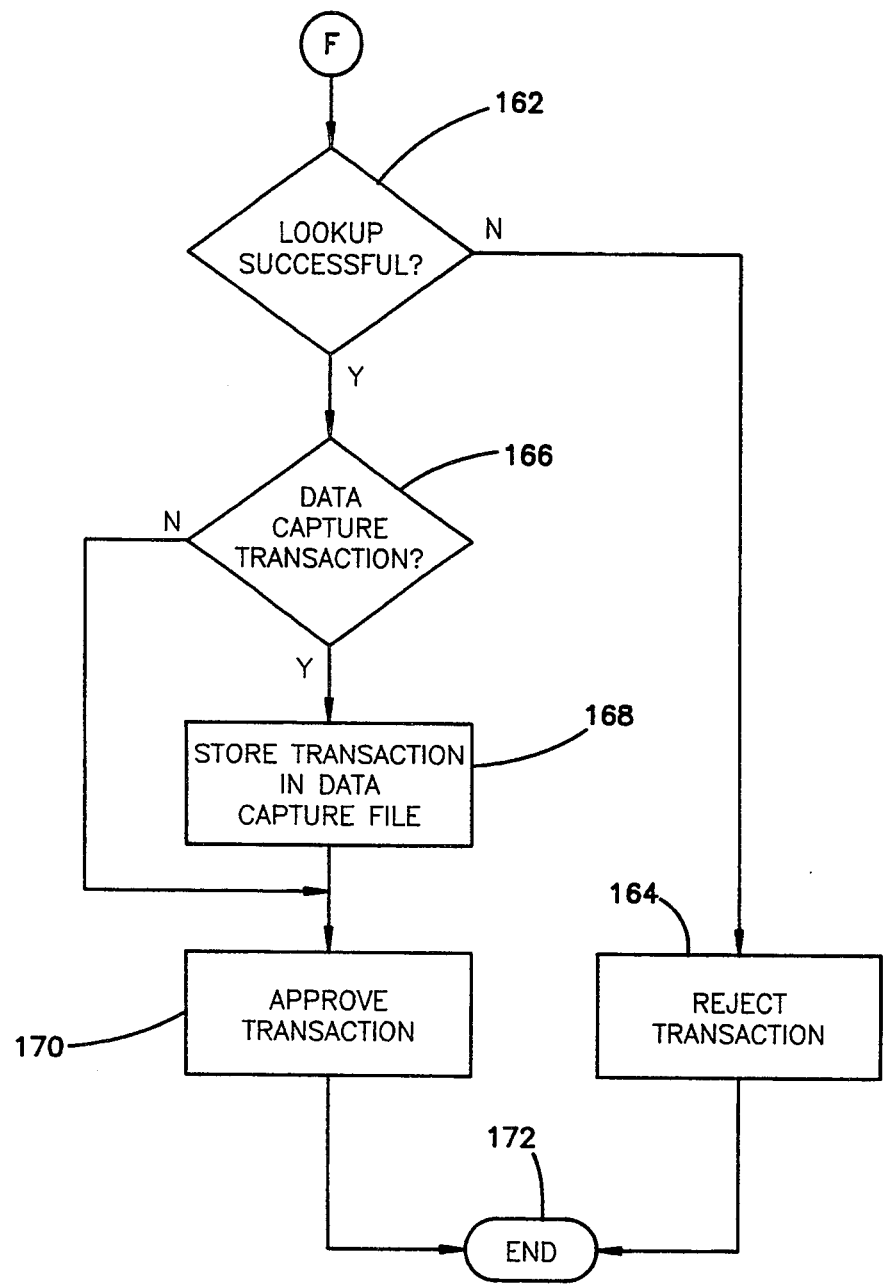

After coupon packets 43 have been mailed to members, the members may choose to use one or more coupons. Because the system is intended to place in the hands of members coupons which bear a relationship to member data, it is expected that the system will increase the use rate, or redemption rate, of the coupons. When the coupon is used (74) by the consumer, a redemption routine 150 is initiated at 152 (FIGS. 9a and 9b). It is initiated at the point-of-sale terminal 72a–72n with the operator scanning (76) the machine readable code 56 on the face of the coupon. Because, in the preferred embodiment, the coupon machine readable code has the same format (UPC bar code) as the machine readable codes on products scanned by scanners 86, the scanning function 76 may be performed on either a coupon 48 or a product (not shown) being purchased. Also, the scanning step 76 may be applied to a conventional coupon which is not generated by focused coupon system 15 but which bears a machine readable code. It is then determined at 156 whether the code scanned at 154 is a coupon generated by coupon system 15.

In order to understand how focused coupon system 15 utilizes machine readable codes, it is first necessary to understand how uniform codes function. In the illustrated embodiment, the Uniform Code Council UPC bar code scheme is used. The UPC bar code is utilized at all conventional laser-scanning point-of-sale terminals in use and has protocols for both products and coupons. Additionally, protocols are available for generating custom codes that are applicable to only a particular retail store or a chain of stores. The UPC bar code has the following components:

| Number of digits | Use |
| --- | --- |
| 1 or 2 | System Identifier |
| 10 | Product Look-up Code |
| 1 | Check-digit |

The system identifier establishes whether the bar code is for (A) a standard product of the type sold by established manufacturers, (B) a standard coupon of the type typically issued by manufactures of products, or (C) an in-store custom application. Depending on the code system, the code digits will have different meaning as will be discussed further below. The check-digit is a parity device to verify that the code has been properly scanned. Once a code is validly read by a reading device, it is necessary to decode the number. The in-store master terminal 70 may interpret the first digit or digits in order to determine which code system applies and then applies the Product Look-Up code digits to a Product Look-up table for the particular code system. The Product Look-Up table must contain a record for each possible Product Look-Up code in order to retrieve the parameters of the item to which the machine readable code applies. In the illustrated embodiment, the disclosed in-store master terminal applies a concatenation of a system identifier code and PLU code (with no check digit) to a single PLU look-up table.

Once the record is retrieved for a scanned code, the master terminal tallies the price to the purchase total, if the code is for a product being purchased. If the code is for a coupon, the master terminal will give a credit against the purchase. The master terminal may optionally verify that a product corresponding to that of the coupon has been purchased as a condition to giving a credit against the purchase. Typically, a transaction record is generated and uploaded to the store management computer in order to adjust the inventory records for the product and for statistical analysis and the like.

For standard coupons of the type typically issued by manufactures, the Product Look-Up code establishes the identity of the manufacturer (5 digits), the product family to which the coupon applies (3 digits), and the value of the coupon (2 digits). The value may be, for example, a discount against the purchase of the product, 2 products for the price of 1, or a free product. It is necessary for each manufacturer to notify each retail store, or store chain, of a particular Product Look-Up code so that the In store master terminal has a record to interpret that code. Thus point-of-sale master terminal 70 must have records corresponding to all coupons outstanding at a time in order to credit the purchase of the product corresponding to the coupon.

For in-store custom codes, the system identifier portion of the code identifies the in-store-use system being used. Coupon system 15 will identify an in-store-use system for a particular mailing. The remainder of the 10 digit look-up code is available for Product Look-up code use. In-store processor 88 assigns and maintains records of Product Look-Up codes used and the parameters represented by the code. These Product Look-Up codes are periodically downloaded to point-of-sale master terminal 70 in order to maintain Product Look-Up code data base 174 therein. In-store custom codes are useful for both product applications and coupon applications. The particular application is identified within the Product Look-Up code record. While the retail store or chain of stores has complete flexibility on how the in-store Product Look-Up codes are used, it is necessary to have a record in the Product Look-Up code data base for each machine readable code in use. Any in-store-use system identifier might be adapted to use with focused coupon system 15.

In the preferred embodiment, focused coupon system 15 uses an in-store custom application code system, although it is capable of using a special form of standard coupon as will be set forth below. In a most preferred embodiment, an in-store code format known as European Article Numbering (EAN) is used for reasons that will be set forth below. Focused coupon system 15 is encoded to provide access to not only the standard coupon parameters of product manufacturer, product family, and coupon value but also a household I.D., or P.I.N., number. In the illustrated embodiment, a 5 digit household I.D. code is used. Larger codes are available by using smaller coupon I.D. codes.

Focused coupon system 15 combines the household I.D. with the coupon parameters in a single code. The benefit of this approach is that it is compatible with existing point-of-sale terminal hardware and software. Such existing equipment is adapted to recognizing only one machine readable code at a time. Thus, proposed coupon schemes having multiple code fields in order to incorporate some form of P.I.N. number are not useable with conventional point-of-sale equipment. The reason is that such conventional equipment will ignore one of the multiple codes. Thus, either the coupon code or the P.I.N. code will be ignored, an impossible situation. To avoid this problem, the prior art has opted for either off-line processing or has requires special code reading equipment which must be used by the cashier when a special coupon is presented. The disadvantages of both schemes are apparent. However, the combination of both coupon I.D. code and a household I.D. code in a single machine readable code, which may be scanned with conventional point-of-sale equipment, presents a formatable hurdle. Because each Product Look-Up code must have a corresponding record in the Product Look-Up data base, the number of records in the data base would be prohibitively large. The reason is that each combination of coupon code and household I.D. code would require a separate record. Thus if there are 10,000 outstanding coupons and 100,000 assigned household I.D. numbers, a total of 10 billion separate records would have to be stored and maintained in Point-of-sale master terminal 70! This is clearly impractical.

Focused coupon system 15 solves these problems in a unique manner by processing the code read by the point-of-sale scanner 86 in two ways. First, in order to process the intended transaction, which requires applying a look-up code to the Product Look-Up data base in point-of-sale master terminal 70, a portion of the original scanned code that represents the household I.D. is replaced with a given generic code. The Product Look-up codes in the PLU data base are suitably modified to correspond to codes made up of a combination of coupon codes and this generic code. Thus only one record is required for each coupon code. When that one record is retrieved, the in-store master terminal can credit the purchaser of the product, keep appropriate transaction records and the like. The in-store system 69 does not become appraised of the coupon program member corresponding to the scanned code bearing their household I.D.

The code read by the point-of-sale scanner is processed in a second manner in order to capture the full data in the read code. This captured data is not decoded but is uploaded by in-store system 69 to master data base 31 for identification of the coupon parameters of the used coupon as well as the household I.D. encoded on the coupon. This captured data is applied to updating data base 31. The captured data does not get decoded at in-store system 69. Therefore, in-store system 69 does not require Product Look-Up records incorporating household I.D. numbers.

An example of a code replacement performed in coupon system 15 in order to obtain Product Look-Up codes for application to the PLU data base 74 is as follows:

| Scanned Code | Meaning | Substitute Code |
|---|---|---|
| 28 | In-store-use code | 28 |
| 12345 | Coupon I.D. | 12345 |
| 67890 | Household I.D. | 00000 |
| 9 | Generic Look-Up Check-digit | 4 |

Thus a scanned code of 2812345678909 becomes 2812345000009 for application to PLU data base 74. The In-store-use code of 28 is indicative of a European Article Number (EAN) code used in the UPC bar code standards. The EAN code system is preferred because existing conventional point-of-sale equipment have existing data-masking capability for EAN code systems. Such data-masking capability may be used in order to substitute a generic code for the household I.D. Where data-masking capability is not available, user-exit programming in the in-store master terminal software, or other source code modification may be used to accomplish the same result.

As an alternative to using in-store code systems, focused coupon system 15 is capable of using a special form of standard coupons of the type used by product manufactures. The standard coupon code system has 10 digits exclusive of the code system identifying digit and check-digit. These 10 digits are all used for identification of coupon parameters as set forth above. A modified version of a standard coupon code has a code appendage which adds an additional 5 code digits. If these extra 5 digits are encoded with the household I.D. of the coupon program member, then point-of-sale terminals capable of physically scanning this supplemental encodation will be able to scan both coupon parameters and household I.D. The same procedure discussed above for substitution of a generic look-up number for the household I.D. would be carried out in order to process the transaction. The entire scanned code (15 digits) would be captured and uploaded by in-store system 69 to master data base 31 for decoding of the coupon parameters and household I.D.

If it is determined at 156 that the scanned code corresponds to a program coupon, the portion of the original scanned code corresponding to the household I.D. is replaced with a generic code portion (158) and the substitute code is applied (160) to PLU data base 174. It is determined at 162 whether a corresponding record was found in the PLU data base, If not, the transaction is rejected. If a corresponding record is found, it is then determined at 166 whether a data capture transaction is to be performed. If the scanned code corresponds to a coupon generated by focused coupon program 15, or if the scanned code corresponds to a standard coupon, then the code data is stored (168) in captured data file data base 176. Data base 176 is periodically uploaded to captured data file data base 92 in in-store processor 88. Data base 92 is, in turn, periodically uploaded (80) to update (82) master data base 31. The captured data is decoded at central processing center 29, not at the in-store system. The captured data is used at central processing center 29 both to provide feedback for generation of the next mailing of coupon packets to members of the focused coupon program and to provide redemption information to the manufactures. This later function can be performed on standard coupons which have not been generated by focused coupon system 15.

If it is determined at 166 that the scanned code is not a coupon for which data is to be captured, for example the code is for a product being purchased, then the control proceeds to 170 where the transaction is approved and the routine is exited at 172.

Conclusion

Thus it is seen that the present invention provides a coupon system that provides coupons to households in a manner which will increase coupon redemption and product sales. The coupon system is organized around a particular retail establishment and is intended to increase the pool of customers who regularly use that store as well as the total purchases of each customer. Each coupon is encoded with a machine readable code (UPC bar code) which needs to be scanned only once at the point-of-sale terminal using the same scanning equipment that scans the purchase of products. Thus, the focused coupon system does not add to the burden of the cashier and can be easily installed on existing equipment in the store. Although the present invention provides a unique system for processing coupons in a nonburdensome manner at the point-of-sale terminal, coupons could alternatively be redeemed by an off-line processing scheme in which the machine readable codes are entered directly into the main data base. The present invention provides full function coupon processing and validation both of system coupons as well as non-system coupons. Coupon redemption is provided that is less prone to fraud and provides a faster rebate to the stores.

The present invention is capable of providing useful data to product manufacturers and to store managers without intrusion into the privacy domain of consumers. It is non-intrusive because unlike other known micromarketing systems, the focused coupon system disclosed herein does not distribute data with names and addresses attached. The system is, further, nondiscriminatory against low income individuals. The only characteristic which will remove a member from the system is prolonged non-use of the system.

The invention has many useful adaptations. For example, it may also be useful as part of a new product launch. By obtaining useful marketing data as well as a data base of consumers having particular consumption habits, manufacturers may target "free" coupons and the like to consumers most likely to be long-term purchasers of products. Furthermore, the present coupon system may be used along with custom designed store promotion programs. For example, the consumer survey could request information regarding the favorite charity of the consumer. Particular coupons could provide donations to the specified charity if a particular product or some total of products is purchased. In order to induce consumers to shop at a particular store, coupon values could be assigned in a manner to award higher discounts to non-customers than to customers. This would tend to induce the non-customers to visit that store.

Additionally, the survey form completed by the consumer joining the coupon program could include questions intended to obtain sufficient information to establish the credit-worthiness of the consumer. The consumer can then be cleared in master terminal 70 to cash checks. Each system coupon used can be applied to a separate file of credit-worthy members in the same manner that the code read by the scanner is applied to the PLU look-up data base to locate a corresponding coupon record. The terminal would prompt the cashier if the coupon user has check cashing privileges. This feature would not compromise the broad, nondiscriminatory application of coupon system 15 because it would not exclude non-credit-worthy members they would just not be cleared for check cashing privileges.

In addition to uploading captured data to the master data base, it is possible to also upload certain transactional data, such as the total purchase price of the transaction in which system coupon is used along with non-coupon transactions. This allows statistical analysis and demonstrations of the usefulness of the focus coupon system.

Changes in modifications in the specifically described embodiments can be carried out without departing from the principles of the invention, which is intended to be limited only by the scope of the dependent claims, as interpreted according to the principles of patent law including the doctrine of equivalence.

The embodiments of the invention in which an exclusive property or privilege is claimed are defined as follows:

1. A computer implemented method of generating and redeeming coupons to provide discounts for particular purchases including:

generating with a computer an original plurality of discount coupons, each encoded with a unique user identification number and a unique coupon identification number;

printing with a printer the generated original plurality of coupons;

transmitting said original plurality of discount coupons to a user corresponding to the user identification number;

scanning said user and coupon identification numbers of redeemed coupons to establish which of said original plurality of discount coupons said user redeems;

generating with said computer another plurality of discount coupons, with at least one of said another plurality of discount coupons selected as a function of at least one of which particular one or ones of said original plurality of discount coupons said user redeems and which particular one or ones of said original plurality of discount coupons said user does not redeem, in order to increase the likelihood of redemption of said another plurality of discount coupons; and printing with a printer said another plurality of discount coupons and transmitting said another plurality of discount coupons to said user corresponding to the user identification number.

2. The method in claim 1 wherein each of said discount coupons includes at least one parameter including a defined purchase criterion that must be met in order to provide said user said discount amount and wherein said another plurality of discount coupons are selected at least as a function of said defined purchase criterion of said original plurality of discount coupons.

3. The method in claim 2 wherein said defined purchase criterion includes purchasing of a particular product.

4. The method in claim 2 wherein said defined purchase criterion includes purchasing of a product from a particular department.

5. The method in claim 2 wherein said defined purchase criterion includes purchasing of a minimum sum total amount.

6. The method in claim 1 further including determining particular attributes of said user and wherein at least one of said another plurality of discount coupons is selected as a function at least of said attributes of said user.

7. The method in claim 1 wherein said generating with said computer another plurality of discount coupons includes assigning a portion of said another plurality of discount coupons that are not a function of which of said original plurality of discount coupons said user redeemed or does not redeem.

8. The method of claim 6 wherein said particular attributes of such user are determined from a questionnaire completed by the user.

9. The method in claim 1 wherein said user identification number and said coupon identification number are encoded in a single machine-readable code.

10. The method of claim 9 wherein said single machine-readable code is a bar code.

11. The method in claim 1 wherein said generating with said computer another plurality of discount coupons includes selecting a particular value of a discount amount of said at least one of said another plurality of discount coupons.

12. The method in claim 1 wherein said generating with said computer another plurality of discount coupons includes selecting a defined purchase criterion for said at least one of said another plurality of discount coupons that must be met in order to provide a discount to the user.

13. The method in claim 12 wherein each of said discount coupons is limited for use at a defined retail establishment.

14. The method of claim 1 wherein each of said discount coupons is limited for use at a defined retail establishment.

15. The method in claim 1 further including:

establishing a plurality of user records in said computer, each of said user records including an identity of a user and at least one attribute of said user;

establishing a plurality of coupon records in said computer, each of said coupon records having a particular value of a coupon parameter; and establishing a plurality of relationship records in said computer relating particular attributes of users and corresponding particular coupon parameters.

16. The method in claim 15 wherein said generating with a computer an original plurality of discount coupons includes selecting with said computer a user record, examining said at least one attribute of the selected user record, selecting a coupon record and assigning the coupon record to the selected user if a relationship record relates the examined attribute with the corresponding coupon parameter of the selected coupon.

17. The method in claim 16 wherein said generating with a computer an original plurality of discount coupons further includes assigning at least one mandatory coupon record to the selected user.

18. The method in claim 16 wherein said generating with a computer an original plurality of discount coupons further includes defining a given number of coupon slots for each user and assigning default coupon records to fill unfilled slots for a selected user for which all coupon records assigned by examining attributes in the user record are exhausted.

19. The method in claim 15 including updating said plurality of user records in response to said scanning.

20. The method in claim 15 wherein said generating with said computer another plurality of discount coupons includes selecting with said computer a user record, examining said at least one attribute of the selected user record, selecting a coupon record and assigning the coupon record to the selected user if a relationship record relates the examined attribute with the corresponding coupon parameter of the selected coupon.

21. The method in claim 20 wherein said generating with said computer another plurality of discount coupons includes assigning at least one mandatory coupon record to the selected user.

22. The method in claim 20 wherein said generating with said computer another plurality of discount coupons includes defining a given number of coupon slots for each user and assigning default coupon records to fill unfilled slots for a selected user for which all coupon records assigned by examining attributes in the user record are exhausted.

23. The method in claim 15 where said at least one attribute of said user is a function of which of said original plurality of discount coupons said user redeems or does not redeem.

24. The method in claim 15 wherein said at least one attribute of said user is determined from a questionnaire completed by that user.

25. The method in claim 1 wherein at least one of said transmitting said original plurality of discount coupons and said transmitting said another plurality of discount coupons includes transmitting promotional literature with the coupons.

26. The method of claim 1 wherein at least one of said transmitting said original plurality of discount coupons and said transmitting said another plurality of discount coupons includes mailing said coupons.

27. The method in claim 1 wherein said scanning includes reading from each of said discount coupons with a code-reading apparatus both said user and coupon identification numbers.

28. The method in claim 27 further including replacing said read user identification number with a generic number in order to produce a substitute code including said generic number and said coupon identification number.

29. The method in claim 28 further including applying said substitute code to a look-up table in order to determine a value of said at least one coupon parameter.

30. The method in claim 29 wherein said look-up table is a price look-up table at a point-of-sale terminal.

31. The method in claim 27 wherein said user identification number and said coupon identification number are combined in a single machine-readable code.

32. The method in claim 31 wherein said single machine-readable code is a bar code.

33. The method of claim 27 wherein said reading includes making a single pass of said machine-readable code past a code-reading apparatus.

34. The method in claim 33 wherein said code-reading apparatus is capable of reading product identification codes of the type that are applied to products.

35. The method of claim 28 wherein said replacing includes writing over said user identification number with said generic number.

36. The method of claim 28 wherein said replacing includes masking said user identification number.

37. The method of claim 27 wherein said reading includes capturing said user and coupon identification numbers and uploading the captured numbers to a master database for decoding the captured identification numbers.

38. The method in claim 37 including uploading the captured numbers to said master data processor utilizing a pair of modems.

39. The method in claim 27 wherein said reading is performed with a point-of-sale terminal by applying a price look-up number derived from the read code to a look-up database in order to determine the particular set of coupon parameters corresponding to the read code.

40. The method in claim 39 wherein said reading further includes capturing the user and coupon identification numbers and uploading the captured numbers to a master database in order to update said master database.

41. The method in claim 39 including transmitting to said point-of-sale terminal coupon data records and corresponding coupon identification number in order to update said look-up database.

42. The method in claim 39 including substituting a generic code for the read user identification number in order to produce said price look-up number derived from said read code.

43. The method in claim 37 wherein said master database includes a plurality of user records, each user record including at least one attribute of the particular user and including updating said plurality of user records with the captured identification numbers.

44. The method in claim 37 including generating from said captured identification number redemption files indicating discount amounts and corresponding purchase criteria for granting said discount amounts.

45. The method in claim 44 further including identifying a particular set of coupon parameters of conventional coupons bearing Uniform Product Code bar codes and generating redemption files for said conventional coupons.

46. The method in claim 1 including generating redemption files for said discount coupons from said coupon identification numbers.

47. The method in claim 46 including generating redemption files for conventional coupons bearing Uniform Product Code bar codes.

48. The method of claim 1 wherein said generating with said computer another plurality of discount coupons includes selecting at least one coupon having as a purchase criterion the purchase of any item from a given department of a particular store, said selecting at least one coupon being in response to the absence of redemption of a coupon from said original plurality of discount coupons that has a purchase criterion for the purchase of an item from said given department.

49. The method of claim 1 wherein said selecting by said computer another plurality of discount coupons includes selecting at least one coupon having as a purchase criterion the purchase of a given product, said selecting at least one coupon occurring after a predetermined time delay from the redemption of a coupon having the same purchase criterion, said time delay equal to an estimated time for the user to consume said product.

50. The method of claim 1 wherein said scanning is performed on-line at a point-of-sale terminal.

51. The method of claim 1 wherein said scanning is performed off-line by directly entering said user and coupon identification numbers in said computer.

* * * * *

UNITED STATES PATENT AND TRADEMARK OFFICE
CERTIFICATE OF CORRECTION

PATENT NO. : 5,353,218
DATED : October 4, 1994
INVENTOR(S) : James P. DeLapa, et al.

It is certified that error appears in the above-indentified patent and that said Letters Patent is hereby corrected as shown below:

Column 24, claim 41, line 16:
"number" should be --numbers--.

Column 24, claim 44, line 28:
"number" should be --numbers--.

Signed and Sealed this -

Twenty-second Day of August, 1995

Attest:

BRUCE LEHMAN

Attesting Officer      Commissioner of Patents and Trademarks